(12) United States Patent
Oveyssi

(10) Patent No.: US 6,791,801 B1
(45) Date of Patent: Sep. 14, 2004

(54) PIVOT BEARING CARTRIDGE INCLUDING BALL BEARING SET AND MAGNET ELEMENT FOR BALL BEARING SET PRE-LOADING

(75) Inventor: Kamran Oveyssi, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 240 days.

(21) Appl. No.: 10/086,469

(22) Filed: Feb. 28, 2002

(51) Int. Cl.[7] .............................................. G11B 21/08
(52) U.S. Cl. ............................................... 360/265.2
(58) Field of Search ........................ 360/265.2, 265.4, 360/265.6; 384/133, 446, 907; 310/90.5

(56) References Cited

U.S. PATENT DOCUMENTS

| | | | | |
|---|---|---|---|---|
| 4,153,993 A | * | 5/1979 | Kataoka et al. ............. | 433/132 |
| 4,726,640 A | * | 2/1988 | Iwama et al. ................ | 359/200 |
| 5,541,460 A | * | 7/1996 | Dunfield et al. ............ | 310/67 R |
| 5,561,335 A | * | 10/1996 | Dunfield et al. ............ | 310/90.5 |
| 5,598,048 A | * | 1/1997 | Dunfield et al. ............ | 310/90.5 |
| 5,698,919 A | * | 12/1997 | Obara ......................... | 310/90 |
| 5,808,839 A | | 9/1998 | Dunfield et al. ........... | 360/265.4 |

FOREIGN PATENT DOCUMENTS

JP          60241518 A    * 11/1985    ........... F16C/39/06

* cited by examiner

Primary Examiner—David Davis
(74) Attorney, Agent, or Firm—Won Tae C. Kim, Esq.; Milad G. Shara, Esq.; Stetina Brunda Garred & Brucker

(57) ABSTRACT

A pivot bearing cartridge for use in a head stack assembly. The cartridge includes a pivot shaft including a central axis, a shaft body and a shaft distal end. The cartridge includes a pivot sleeve disposed about the pivot shaft. The pivot sleeve includes a pivot sleeve annular body and a pivot sleeve closed end disposed adjacent the shaft distal end. The cartridge includes a ball bearing set disposed between and in mechanical communication with the shaft body and the pivot sleeve annular body. The cartridge includes a shaft magnet element attached to the shaft distal end adjacent the pivot sleeve closed end. The shaft magnet element is sized and configured to apply a magnetic force to the pivot sleeve in a direction along the central axis for pre-loading the ball bearing set.

41 Claims, 4 Drawing Sheets

PIVOT BEARING CARTRIDGE INCLUDING BALL BEARING SET AND MAGNET ELEMENT FOR BALL BEARING SET PRE-LOADING

CROSS-REFERENCE TO RELATED APPLICATIONS

Not Applicable.

1. Field of the Invention

The present invention relates generally to pivot bearing cartridges for use in head stack assemblies, and more particularly to a pivot bearing cartridge including a ball bearing set and a magnet element for ball bearing set pre-loading.

2. Description of the Prior Art

The typical hard disk drive includes a disk drive base, and a head disk assembly (HDA) and a printed circuit board assembly (PCBA) attached to the disk drive base. The head disk assembly includes at least one magnetic disk, a spindle motor for rotating the disk, and a head stack assembly (HSA) that includes at least one transducer head, typically several, for reading and writing data from the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit cable assembly. A conventional "rotary" or "swing-type" actuator assembly typically comprises an actuator body that rotates on a pivot assembly between limited positions, a coil portion that extends from one side of the actuator body to interact with one or more permanent magnets to form a voice coil motor, and one or more actuator arms that extend from an opposite side of the actuator body. A head gimbal assembly includes at least one transducer head, sometimes two, which is distally attached to each of the actuator arms. The actuator assembly includes the actuator body which has a bore and a pivot bearing cartridge engaged within the bore. The at least one head gimbal assembly and the flex circuit cable assembly are attached to the actuator assembly.

The pivot bearing cartridge typically includes a pivot shaft having a threaded end, a pivot sleeve, and vertically separated upper and lower ball bearing sets mounted upon the pivot shaft which facilitate rotational attachment of the pivot sleeve to the pivot shaft. The pivot sleeve is disposed within the bore of the actuator body for allowing the pivoting of the actuator assembly. The threaded end of the pivot shaft used to mount the pivot bearing cartridge, and therefore the actuator assembly, to the disk drive base. Each ball bearing set includes inner and outer ball bearing races which encase a plurality of ball bearings. The inner ball bearing races engage the pivot shaft and the outer ball bearing races engage the pivot sleeve. This configuration allows for rotational movement of the outer ball bearing races relative to the inner ball bearing races for rotation of the pivot sleeve. The upper and lower ball bearing sets are pre-loaded in compression to maintain the pivot sleeve in position with respect to the pivot shaft.

A topic of concern is the desire to reduce the overall disk drive size. Such disk drives may have a variety of applications such as in hand held or portable electronic devices. The exterior size and shape of the disk drive is often referred to as a "form factor". Reduction of such disk drive form factor has proven challenging. This is because the mere reduction of the size of the various disk drive components may result in such components being unable to conform to required specifications and standard form factors for such components, and may result in installation or assembly difficulties. As such reduced sized disk drives may have applications in hand held or mobile electronic devices, the specifications may even be tighter as compared to personal computer applications. For example, those specifications related to susceptibility to damage resulting from shock.

One particular area of focus is the reduction of the height of the pivot bearing cartridge as this limits the overall sizing of the head stack assembly. In a typical configuration, the pivot bearing cartridge height may be a function of the upper and lower ball bearing set arrangement. The mere reduction of the sizing of the upper and lower ball bearing sets impacts the susceptibility to damage resulting from shock, potential use of non-standard form factor bearings and difficulties conforming to allotted space requirements for such bearings. Accordingly, there is a need in the art for an improved pivot bearing cartridge configuration in comparison to the prior art.

SUMMARY OF THE INVENTION

An aspect of the invention can be regarded as a pivot bearing cartridge for use in a head stack assembly. The pivot bearing cartridge includes a pivot shaft including a central axis, a shaft body and a shaft distal end. The pivot bearing cartridge further includes a pivot sleeve disposed about the pivot shaft. The pivot sleeve includes a pivot sleeve annular body and a pivot sleeve closed end disposed adjacent the shaft distal end. The pivot bearing cartridge further includes a ball bearing set disposed between and in mechanical communication with the shaft body and the pivot sleeve annular body. The pivot bearing cartridge further includes a shaft magnet element attached to the shaft distal end adjacent the pivot sleeve closed end. The shaft magnet element is sized and configured to apply a magnetic force to the pivot sleeve in a direction along the central axis for pre-loading the ball bearing set.

According to various embodiments, the shaft magnet element may be sized and configured to apply an attractive magnetic force to the pivot sleeve in a direction along the central axis for pre-loading the ball bearing set. The shaft magnet element may be disposed within the shaft body. The shaft magnet element may include an exposed surface facing the pivot sleeve closed end. The pivot sleeve may include a pivot sleeve insert disposed at the pivot sleeve closed end adjacent the shaft magnet element for magnetically interacting with the shaft magnet element. The pivot sleeve insert may be formed of a magnetic metal material, such as a steel. In another arrangement, the pivot sleeve insert may be formed of a magnetic material. The shaft body may extend to a shaft distal annular surface concentrically about the shaft magnet element facing the pivot sleeve insert.

In addition, according to another aspect of the present invention, there is provided a head stack assembly. The head stack assembly includes a rotary actuator including a bore, and a pivot to bearing cartridge as described above. The pivot sleeve is positioned within the bore of the rotary actuator. According to another aspect of the present invention, there is provided a disk drive including a disk drive housing, and a head stack assembly as described above rotatably coupled to the disk drive housing.

According to another aspect of the present invention, there is provided a pivot bearing cartridge for use in a head stack assembly coupled to a disk drive housing. The pivot bearing cartridge includes a pivot shaft including a central axis and a shaft body along the central axis. The pivot bearing cartridge further includes a pivot sleeve including a pivot sleeve annular body and a first pivot sleeve end disposable adjacent the disk drive housing. The pivot bearing cartridge further includes a ball bearing set disposed between and in mechanical communication with the shaft body and the pivot sleeve annular body. The pivot bearing cartridge further includes a pivot sleeve magnet element attached to the first pivot sleeve end. The pivot sleeve magnet element is disposable adjacent the disk drive housing. The pivot sleeve magnet element is sized and configured to apply a magnetic force to the disk drive housing in a direction along the central axis for pre-loading the ball bearing set.

According to various embodiments, the pivot sleeve magnet element may be sized and configured to apply a repulsive magnetic force to the disk drive housing in a direction along the central axis for pre-loading the ball bearing set. The pivot sleeve magnet element may be annular shaped. The pivot shaft may include a shaft base. The shaft base extends radially from the central axis with the shaft body extending from the shaft base along the central axis. The shaft base is attachable to the disk drive housing, and the first pivot sleeve end is disposed adjacent the shaft base. The pivot sleeve magnet element is disposed adjacent the shaft base, and the pivot sleeve magnet element is sized and configured to apply a magnetic force to the shaft base in a direction along the central axis for pre-loading the ball bearing set. The shaft body may be integrally formed with the shaft base. In addition, the shaft base may be integrally formed with the disk drive housing. The shaft base may include a base magnet element. The pivot sleeve magnet element is disposable adjacent the base magnet element, and the pivot sleeve magnet element and the base magnet element are sized and configured to apply magnetic forces with respect to each other in a direction along the central axis for pre-loading the ball bearing set. The base magnet element may have a diameter the same as a diameter of the pivot sleeve magnet element. Alternatively, the base magnet element may have a diameter greater than a diameter of the pivot sleeve magnet element. The base magnet element may be annular shaped.

In addition, according to another aspect of the present invention, there is provided a head stack assembly. The head stack assembly includes a rotary actuator including a bore, and a pivot bearing cartridge as described above disposed within the bore. According to another aspect of the present invention, there is provided a disk drive including a disk drive housing, and a head stack assembly as described above rotatably coupled to the disk drive housing.

DESCRIPTION OF THE PREFERRED EMBODIMENTS

Figure 1:
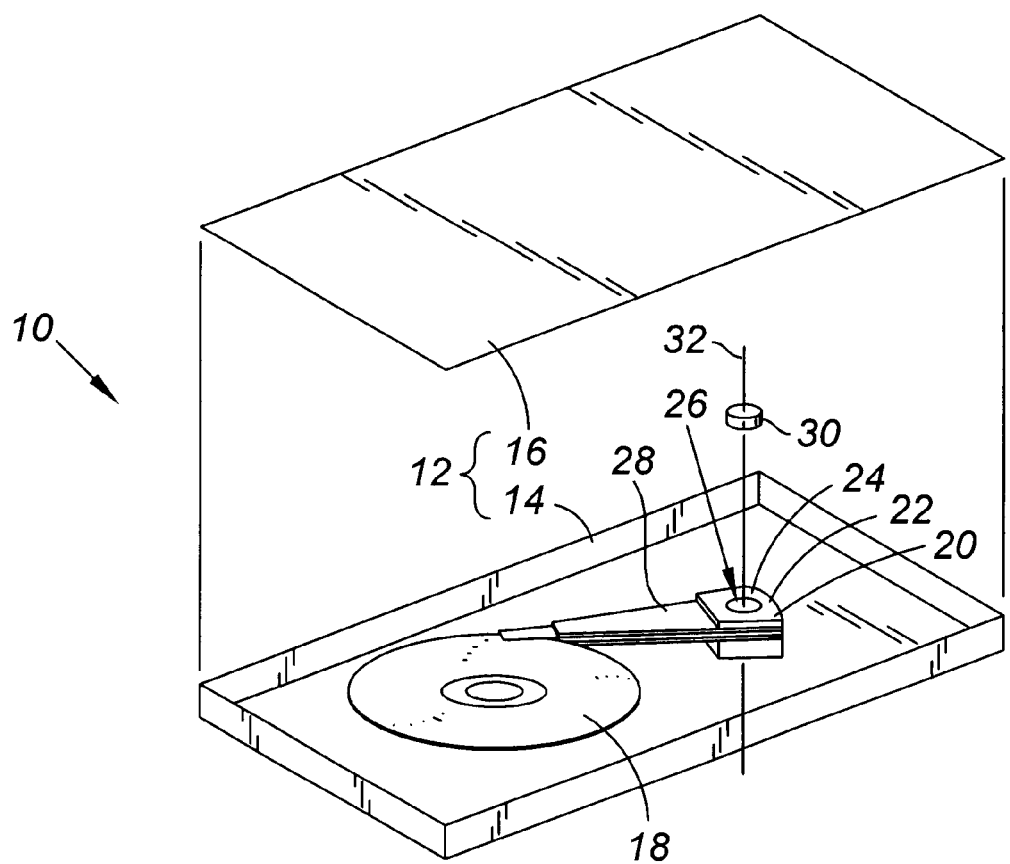
FIG. 1 is an exploded perspective view of a disk drive including a head stack assembly with a pivot bearing cartridge as constructed in accordance with an aspect of the present invention.

Referring now to the drawings wherein the showings are for purposes of illustrating preferred embodiments of the present invention only, and not for purposes of limiting the same, FIGS. 1–6 illustrate a disk drive and pivot bearing cartridges in accordance with the aspects of the present invention.

Referring now to FIG. 1 there is depicted an exploded perspective view of a disk drive 10 constructed in accordance with an aspect of the present invention. The disk drive 10 includes a head disk assembly (HDA) and a printed circuit board assembly (PCBA). The head disk assembly includes a disk drive housing 12 that may include a disk drive base 14 and a cover 16 that collectively house at least one magnetic disk 18. The disk 18 contains a plurality of tracks for storing data. The head disk assembly further includes a spindle motor (not shown) for rotating the disk 18 and a head stack assembly 20.

The head stack assembly 20 includes a rotary actuator 22 that includes an actuator body 24 having a bore 26. An actuator arm 28 extends from the actuator body 24, and a head is attached from a distal end of the actuator arm 28. The head stack assembly 20 further includes a pivot bearing cartridge 30 which is disposed within the bore 24 of the actuator body 22. The pivot bearing cartridge 30 is attached to the disk drive housing 12, such as via attachment to the disk drive base 14. The pivot bearing cartridge 30 facilitates rotation of the actuator assembly about a central axis 32 so as to move the head relative to the disk 18 for reading and writing operations with respect to the tracks contained on the disk 18.

Figure 2:
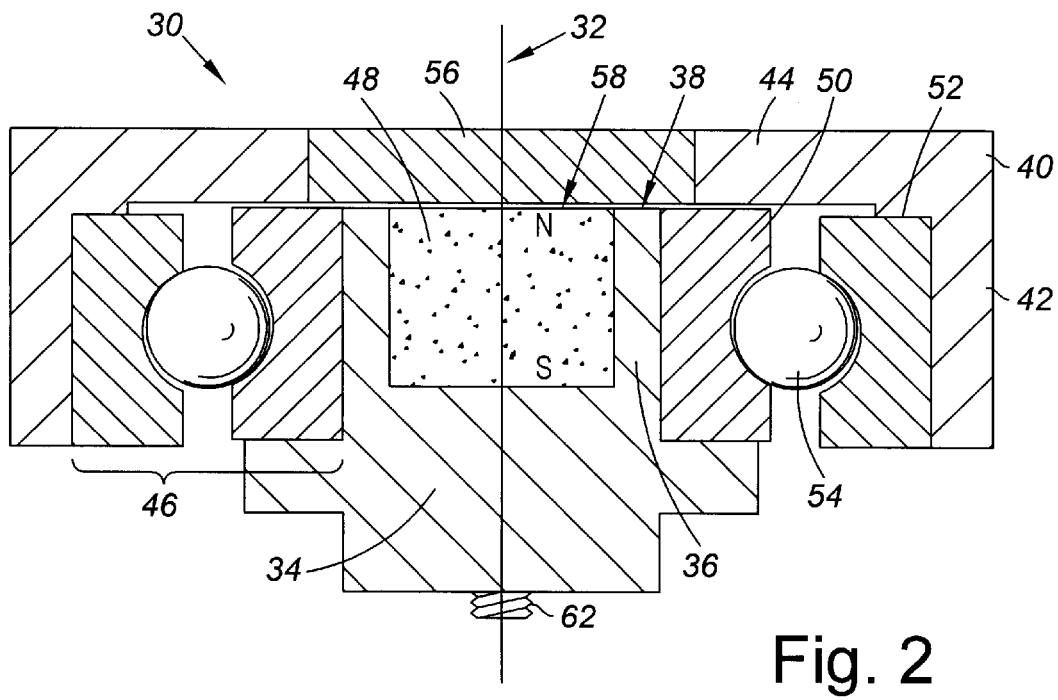
FIG. 2 is a cross sectional view of the pivot bearing cartridge of FIG. 1 including a ball bearing set and a shaft magnet element for pre-loading the ball bearing set.

Referring now to FIG. 2, there is depicted a cross sectional view of the pivot bearing cartridge 30 as constructed in accordance with an embodiment of the present invention. An aspect of the invention can be regarded as the pivot bearing cartridge 30 for use in the head stack assembly 20. The pivot bearing cartridge 30 includes a pivot shaft 34 including the central axis 32, a shaft body 36 and a shaft distal end 38. The pivot bearing cartridge 30 further includes a pivot sleeve 40 disposed about the pivot shaft 34. The pivot sleeve 40 includes a pivot sleeve annular body 42 and a pivot sleeve closed end 44 disposed adjacent the shaft distal end 38. The pivot bearing cartridge 30 further includes a ball bearing set 46 disposed between and in mechanical communication with the shaft body 36 and the pivot sleeve annular body 42. The pivot bearing cartridge 30 further includes a shaft magnet element 48 attached to the shaft distal end 38 adjacent the pivot sleeve closed end 44. The shaft magnet element 48 is sized and configured to apply a magnetic force to the pivot sleeve 40 in a direction along the central axis 32 for pre-loading the ball bearing set 46.

In further detail, the pivot sleeve annular body 42 is contemplated to be sized and configured to engage the bore 26 of the actuator body 24. In addition, the ball bearing set 46 has an inner race 50 and an outer race 52. The inner race 50 and the outer race 52 cooperatively encase a plurality of ball bearings 54. Advantageously, the shaft magnet element 48 facilitates pre-loading of the ball bearing set 46 in compression. In this regard, forces are applied such that inner and outer races 50, 52 apply compressive forces against the ball bearings 54.

Such preloading in compression of the ball bearing set 46 is contemplated to stabilize pivot sleeve 40 such that the pivot sleeve 40 is substantially limited to rotational movement about the pivot shaft 36. This is accomplished through the use of the shaft magnet element 48 and magnetic interaction with the pivot sleeve 40 at the pivot sleeve closed end 44. As such, when utilized in the actuator body 24, the actuator body 24 is likewise limited in degrees of freedom to such rotational movement and thereby facilitates precise control of the positioning of the heads of the head stack assembly 20 with respect to tracks of the disk 18. In this respect, the present invention allows for such stabilization of the pivot sleeve 40 without the need for a second ball bearing set. Prior art pivot bearing cartridges typically utilize a pair of vertically stacked ball bearing sets disposed about a shaft for stability of a surrounding pivot sleeve. However, through the unique use of the shaft magnet element 48, the pivot bearing cartridge 30 of the present invention does not require a second ball bearing set. As a result, the pivot bearing cartridge 30 facilitates a vertically efficient design in comparison to prior art arrangements.

The shaft magnet element 48 is preferably sized and configured to apply an attractive magnetic force to the pivot sleeve 40 in a direction along the central axis 32 for pre-loading the ball bearing set 46. In the embodiment shown, the pivot sleeve 40 includes a pivot sleeve insert 56 disposed at the pivot sleeve closed end 44 adjacent the shaft magnet element 48 for magnetically interacting with the shaft magnet element 48. In this regard, the pivot sleeve insert 56 may be formed of a magnetic metal material, such as a steel as shown. In another arrangement, the pivot sleeve insert 56 may be formed of a magnetic material. With the interaction between the shaft magnet element 48 and the pivot sleeve 40 being attractive, it is contemplated that the opposite poles of the shaft magnet 48 and the pivot sleeve insert 56 in its magnetic embodiment are disposed adjacent each other. The size and configuration of the ball bearing set 46 is such that the shaft magnet element 48 and the pivot sleeve insert 56 are in close proximity but do not come into contact, thereby allowing freedom of rotation of the pivot sleeve 40 with respect to the pivot shaft 34.

The shaft magnet element 48 may be disposed within the shaft body 36. This facilitates the vertical sizing of the shaft magnet element 48 in a direction along the central axis 32 without increasing the height of the pivot shaft 34 in such direction, thereby further facilitating a low profile design of the overall pivot bearing cartridge 30. An exposed surface 58 of the shaft magnet element 48 is disposed facing the pivot sleeve closed end 44, and in particular the pivot sleeve insert 56. The shaft body 36 may extend to a shaft distal annular surface 60 concentrically about the shaft magnet element 48 also facing the pivot sleeve insert 56. As such the pivot sleeve insert 56 preferably extends adjacent both the exposed surface 58 of the shaft magnet element 48 and the shaft distal annular surface 60. It is contemplated that such configuration allows for an efficient magnetic path for interaction between the shaft magnet element 48 and the pivot sleeve insert 56. In this regard, FIG. 3 is the cross sectional view of the pivot bearing cartridge 30 of FIG. 2 as shown with exemplary magnetic flux lines related to the shaft magnet element 48 and the pivot sleeve insert 56 (in its steel embodiment) in such magnetically attractive configuration.

The pivot shaft 34 may include a threaded end 62 opposite the shaft distal end 38. Such a threaded end 62 may facilitate secure attachment of the pivot shaft 34 to the disk drive housing 12 and in particular the disk drive base 14. Though not shown, however, the pivot shaft 34 need not be a separately formed structure from the disk drive base 14 and may be integrally formed with the disk drive base 14.

Figure 3:
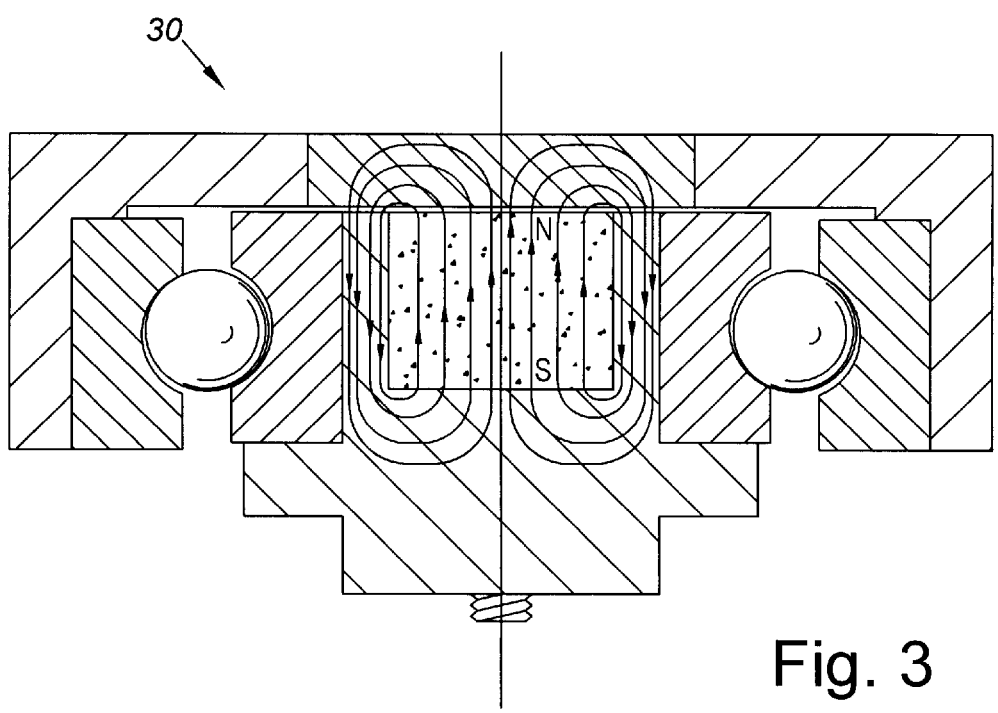
FIG. 3 is the cross sectional view of the pivot bearing cartridge of FIG. 2 as shown with exemplary magnetic flux lines related to the shaft magnet element.
Figure 4:
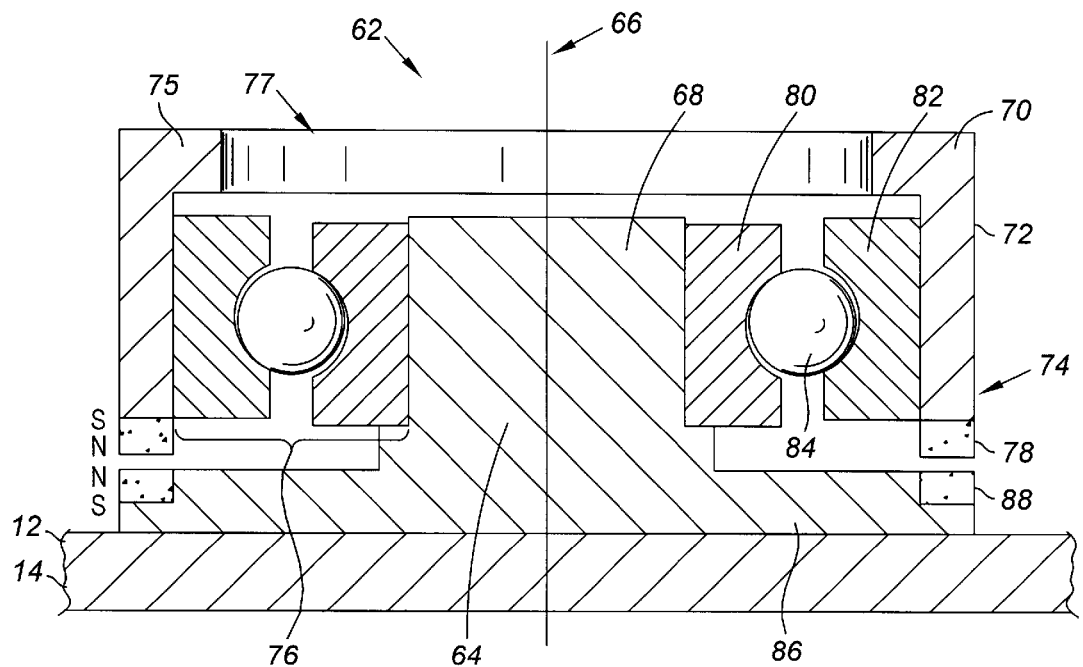
FIG. 4 is a cross sectional view similar to that of FIG. 2, however, of a pivot bearing cartridge according to another aspect of the present invention including a ball bearing set and a to pivot sleeve magnet element for pre-loading the ball bearing set.

Referring now to FIG. 4, there is depicted a cross sectional view similar to that of FIG. 3 of a pivot bearing cartridge 62 according to another aspect of the present invention. The pivot bearing cartridge 62 is contemplated for use in the head stack assembly 20 as coupled to a disk drive housing 12 of the disk drive 10. The pivot bearing cartridge 62 includes a pivot shaft 64 including a central axis 66 and a shaft body 68 along the central axis 66. The pivot bearing cartridge 62 further includes a pivot sleeve 70 including a pivot sleeve annular body 72 and a first pivot sleeve end 74 disposable adjacent the disk drive housing 12. The pivot bearing cartridge 62 further includes a ball bearing set 76 disposed between and in mechanical communication with the shaft body 68 and the pivot sleeve annular body 72. The pivot bearing cartridge 62 further includes a pivot sleeve magnet element 78 attached to the first pivot sleeve end 74. The pivot sleeve magnet element 78 is disposable adjacent the disk drive housing 12. The pivot sleeve magnet element 78 is sized and configured to apply a magnetic force to the disk drive housing 12 in a direction along the central axis 66 for pre-loading the ball bearing set 76.

In further detail, the pivot sleeve annular body 72 is contemplated to be sized and configured to engage the bore 26 of the actuator body 24. In addition, the ball bearing set 76 has an inner race 80 and an outer race 82. The inner race 80 and the outer race 82 cooperatively encase a plurality of ball bearings 84. The pivot sleeve 70 may include a second pivot sleeve end 75 that has an opening 77 for access to the inner and races 80, 82 for installation of the ball bearing set 76 in attachment with the shaft body 68 and the pivot sleeve annular body 72. Advantageously, the pivot sleeve magnet element 78 facilitates pre-loading of the ball bearing set 76 in compression. In this regard, forces are applied such that inner and outer races 80, 82 apply compressive forces against the ball bearings 84.

In the embodiment shown, the pivot sleeve magnet element 78 is annular shaped and is disposed distally at the first pivot sleeve end 74. The pivot sleeve magnet element 78 is preferably sized and configured to apply a repulsive magnetic force to the disk drive housing 12 in a direction along the central axis 66 for pre-loading the ball bearing set 76. As such, the pivot sleeve 70 is peripherally supported through such repulsive force, and is urged upward with the outer bearing race 82 exerting an upward force against the ball bearings 84.

Such preloading in compression of the ball bearing set 76 is contemplated to stabilize the pivot sleeve 70 such that the pivot sleeve 70 is substantially limited to rotational movement about the pivot shaft 64. This is accomplished through the use of the pivot sleeve magnet element 78 and magnetic interaction with respect to the pivot shaft 64. As such, when utilized in the actuator body 24, the actuator body 24 is likewise limited in degrees of freedom to such rotational movement and thereby facilitates precise control of the positioning of the heads of the head stack assembly 20 with respect to tracks of the disk 18. In this respect, the present invention allows for such stabilization of the pivot sleeve 70 without the need for a second ball bearing set. Prior art pivot bearing cartridges typically utilize a pair of vertically stacked ball bearing sets disposed about a shaft for stability of a surrounding pivot sleeve. However, through the unique use of the pivot sleeve magnet element 78, the pivot bearing cartridge 62 of the present invention does not require a second ball bearing set. As a result, the pivot bearing cartridge 62 facilitates a vertically efficient design in comparison to prior art arrangements.

The pivot shaft 70 may include a shaft base 86. The shaft base 86 extends radially from the central axis 66 with the shaft body 68 extending from the shaft base 86 along the central axis 66. The shaft base 86 may be integrally formed with the shaft body 68 as shown, but may be a separately formed structure attached to the shaft body 68. The shaft base 86 is configured to be attachable to the disk drive housing 12. As shown, the shaft base 86 is attached to the disk drive housing 12 by attachment to the disk drive base 14. The first pivot sleeve end 74 and the attached pivot sleeve magnet element 78 are disposed adjacent the shaft base 86. As such, the first pivot sleeve end 74 and the pivot sleeve magnet element 78 are disposed adjacent the disk drive housing 12 via being disposed adjacent the shaft base 86 that is attached to the disk drive housing 12.

The pivot sleeve magnet element 78 is sized and configured to apply a magnetic force to the shaft base 86 in a direction along the central axis 66 for pre-loading the ball bearing set 76. The shaft base 86 may include a base magnet element 88. The pivot sleeve magnet element 78 is disposable adjacent the base magnet element 88. The pivot sleeve magnet element 78 and the base magnet element 88 are sized and configured to apply magnetic forces with respect to each other in a direction along the central axis 66 for pre-loading the ball bearing set 76. Like the pivot sleeve magnet element 78, the base magnet element 88 may be annular shaped. The base magnet element 88 may have a diameter the same as a diameter of the pivot sleeve magnet element 78. In this regard, the pivot sleeve magnet element 78 and the base magnet element 88 may be aligned as shown.

Figure 5:
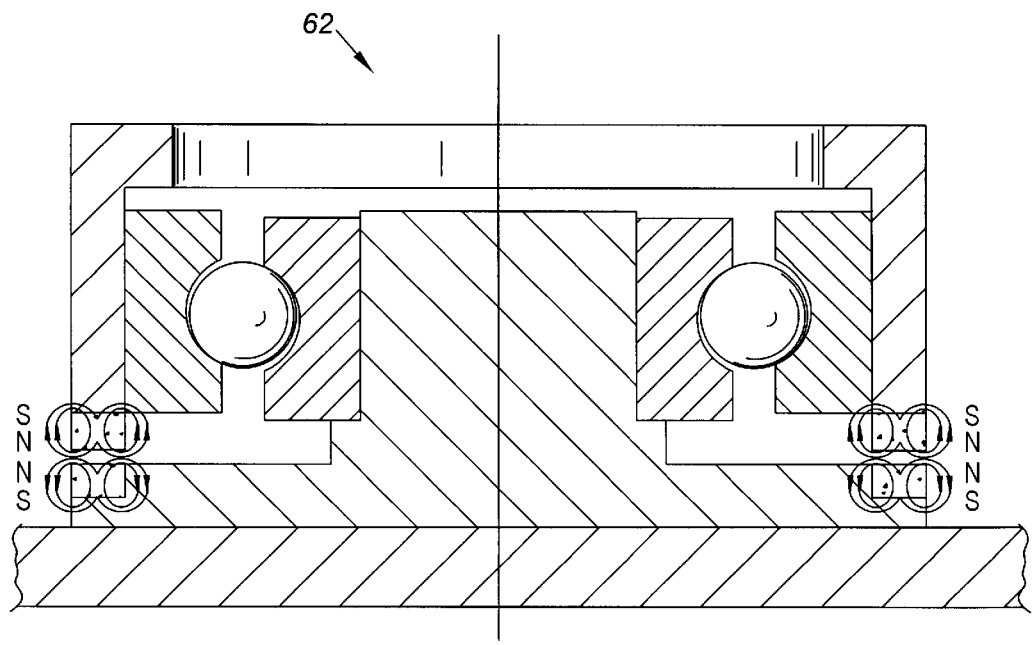
FIG. 5 is the cross sectional view of the pivot bearing cartridge of FIG. 4 as shown with exemplary magnetic flux lines related to the pivot sleeve magnet element.

As mentioned above, the pivot sleeve magnet element 78 is sized and configured to apply a repulsive magnetic force to the disk drive housing 12 in a direction along the central axis 66 for pre-loading the ball bearing set 76. In this regard, FIG. 5 is the cross sectional view of the pivot bearing cartridge 62 of FIG. 4 as shown with exemplary magnetic flux lines related to the pivot sleeve magnet element 78 and the base magnet element 88 in such magnetically repulsive configuration.

Figure 6:
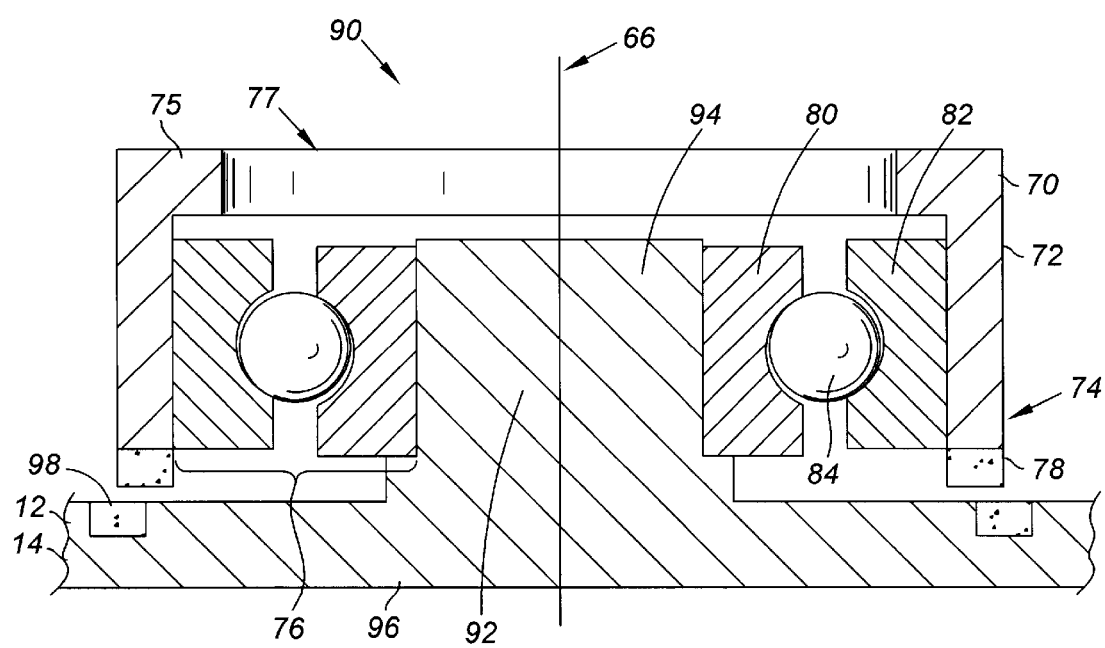
FIG. 6 is a cross sectional view similar to that of FIG. 4, however, of a pivot bearing cartridge according to another embodiment with a housing magnet element attached to a disk drive housing.

Referring now to FIG. 6, there is depicted a cross sectional view similar to that of FIG. 4, however of a pivot bearing cartridge 90 according to another aspect of the present invention. The pivot bearing cartridge 90 is configured as above described pivot bearing cartridge 62, with the differences noted below.

The pivot bearing cartridge 90 includes a pivot shaft 92. The pivot shaft 92 includes a shaft body 94 and a shaft base 96. In this embodiment, the shaft body 94 is integrally formed with the shaft base 96. Further, the shaft base 96 is integrally formed with the disk drive housing 12, and in particular, the disk drive base 14. The pivot bearing cartridge 90 may further include a base magnet element 98. The base magnet element 98 is similar to the base magnet element 88, however, the base magnet element 98 has a diameter greater than the diameter of the pivot sleeve magnet element 88. The shaft base 96, and therefore the disk drive base 14, is configured to receive in attachment the base magnet element 98. As such, it is understood that in this embodiment, the shaft base 96 is that portion of the disk drive base 14 which supports the shaft body 94 and the base magnet element 98.

It is contemplated that the pivot sleeve magnet element 78 and the base magnet element 98 are preferably configured to magnetically interact in repulsion. The larger sizing of the base magnet element 98 allows for uniform lateral magnetic forces to be applied to the pivot sleeve 70. This is contemplated to stabilize and maintain the horizontal positioning of the pivot sleeve 70 in relation to the pivot shaft 92.

I claim:

1. A pivot bearing cartridge for use in a head stack assembly, the pivot-bearing cartridge comprising:
   a pivot shaft including a central axis, a shaft body and a shaft distal end;
   a pivot sleeve disposed about the pivot shaft, the pivot sleeve including a pivot sleeve annular body and a pivot sleeve closed end disposed adjacent the shaft distal end;
   a ball bearing set disposed between and in mechanical communication with the shaft body and the pivot sleeve annular body for rotating the pivot sleeve with respect to the pivot shaft; and
   a shaft magnet element attached to the shaft distal end adjacent the pivot sleeve closed end, the shaft magnet element being sized and configured to apply a magnetic force to the pivot sleeve in a direction along the central axis for pre-loading the ball bearing set.

2. The pivot bearing cartridge of claim 1 wherein the shaft magnet element is sized and configured to apply an attractive magnetic force to the pivot sleeve in a direction along the central axis for pre-loading the ball bearing set.

3. The pivot bearing cartridge of claim 1 wherein the shaft magnet element is disposed within the shaft body.

4. The pivot bearing cartridge of claim 3 wherein the shaft magnet element includes an exposed surface facing the pivot sleeve closed end.

5. The pivot bearing cartridge of claim 1 wherein the pivot sleeve includes a pivot sleeve insert disposed at the pivot sleeve closed end adjacent the shaft magnet element for magnetically interacting with the shaft magnet element.

6. The pivot bearing cartridge of claim 5 wherein the pivot sleeve insert is formed of a magnetic metal material.

7. The pivot bearing cartridge of claim 6 wherein the magnetic metal material is a steel.

8. The pivot bearing cartridge of claim 5 wherein the pivot sleeve insert is formed of a magnetic material.

9. The pivot bearing cartridge of claim 5 wherein the shaft body extends to a shaft distal annular surface concentrically about the shaft magnet element facing the pivot sleeve insert.

10. A head stack assembly comprising:
    rotary actuator including bore; and
    a pivot bearing cartridge including:
      a pivot shaft including a central axis, a shaft body and a shaft distal end;
      a pivot sleeve disposed about the pivot shaft, the pivot sleeve including a pivot sleeve annular body and a pivot sleeve closed end disposed adjacent the shaft distal end, the pivot sleeve being positioned within the bore of the rotary actuator;
      a ball bearing set disposed between and in mechanical communication with the shaft-body and the pivot sleeve annular body for rotating the pivot sleeve with respect to the pivot shaft; and a shaft magnet element attached to the shaft distal end adjacent the pivot sleeve closed end, the shaft magnet element being sized and configured to apply a magnetic force to the pivot sleeve in a direction along the central axis for pre-loading the ball bearing set.

11. The head stack assembly of claim 10 wherein the shaft magnet element is sized and configured to apply an attractive magnetic force to the pivot sleeve in a direction along the central axis for pre-loading the ball bearing set.

12. The head stack assembly of claim 10 wherein the pivot sleeve includes a pivot sleeve insert disposed at the pivot sleeve closed end adjacent the shaft magnet element for magnetically interacting with the shaft magnet element.

13. The head stack assembly of claim 12 wherein the pivot sleeve insert is formed of a magnetic metal material.

14. A disk drive comprising:
a disk drive housing; and
a head stack assembly rotatably coupled to the disk drive housing, the head stack assembly including:
a rotary actuator including a bore;
a pivot bearing cartridge including:
a pivot shaft including a central axis, a shaft body and a shaft distal end;
a pivot sleeve disposed about the pivot shaft, the pivot sleeve including a pivot sleeve annular body and a pivot sleeve closed end disposed adjacent the shaft distal end, the pivot sleeve being positioned within the bore of the rotary actuator;
a ball bearing set disposed between and in mechanical communication with the shaft body and the pivot sleeve annular body for rotating the pivot sleeve with respect to the pivot shaft; and
a shaft magnet element attached to the shaft distal end adjacent the pivot sleeve closed end, the shaft magnet element being sized and configured to apply a magnetic force to the pivot sleeve in a direction along the central axis for pre-loading the ball bearing set.

15. The disk drive of claim 14 wherein the shaft magnet element is sized and configured to apply an attractive magnetic force to the pivot sleeve in a direction along the central axis for pre-loading the ball bearing set.

16. The disk drive of claim 14 wherein the pivot sleeve includes a pivot sleeve insert disposed at the pivot closed end adjacent the shaft magnet element for magnetically interacting with the shaft magnet element.

17. The disk drive of claim 16 wherein the pivot sleeve insert is formed of a magnetic metal material.

18. A pivot bearing cartridge for use in a head stack assembly coupled a disk drive housing, the pivot bearing cartridge comprising:
a pivot shaft including a central axis and a shaft body disposed along the central axis;
a pivot sleeve including a pivot sleeve annular body and a first pivot sleeve end disposable adjacent the disk drive housing;
a ball bearing set disposed between and in mechanical communication with the shaft body and the pivot sleeve annular body; and a
a pivot sleeve magnet element attached to the first pivot sleeve end, the pivot sleeve magnet element being disposable adjacent the disk drive housing, the pivot sleeve magnet element being sized and configured to apply a magnetic force to the disk drive housing in a direction along the central axis for pre-loading the ball bearing set.

19. The pivot bearing cartridge of claim 18 wherein the pivot sleeve magnet element is sized and configured to apply a repulsive magnetic force to the disk drive housing in a direction along the central axis for pre-loading the ball bearing set.

20. The pivot bearing cartridge of claim 18 wherein the pivot sleeve magnet element is annular shaped.

21. The pivot bearing cartridge of claim 18 wherein the pivot shaft includes a shaft base, the shaft base extends radially from the central axis with the shaft body extending from the shaft base along the central axis, the shaft base is attachable to the disk drive housing, the first pivot sleeve end is disposed adjacent the shaft base, the pivot sleeve magnet element is disposed adjacent the shaft base, the pivot sleeve magnet element is sized and configured to apply a magnetic force to the shaft base in a direction along the central axis for pre-loading the ball bearing set.

22. The pivot bearing cartridge of claim 21 wherein the shaft body is integrally formed with the shaft base.

23. The pivot sleeve cartridge of claim 21 wherein the shaft base is integrally formed with the disk drive housing.

24. The pivot bearing cartridge of claim 21 wherein the shaft base includes a base magnet element, the pivot sleeve magnet element is disposable adjacent the base magnet element, the pivot sleeve magnet element and the base magnet element are sized and configured to apply magnetic forces with respect to each other in a direction along the central axis for pre-loading the ball bearing set.

25. The pivot bearing cartridge of claim 24 wherein the base magnet element has a diameter the same as a diameter of the pivot sleeve magnet element.

26. The pivot bearing cartridge of claim 24 wherein the base magnet element has a diameter greater than a diameter of the pivot sleeve magnet element.

27. The pivot bearing cartridge of claim 24 wherein the base magnet element is annular shaped.

28. A head stack assembly for use coupled to a disk drive housing, the head stack assembly comprising:
a rotary actuator including a bore; and
a pivot bearing cartridge including:
a pivot shaft including a central axis and a shaft body disposed along the central axis;
a pivot sleeve including a pivot sleeve annular body and a first pivot sleeve end disposable adjacent the disk drive housing;
a ball bearing set disposed between and in mechanical communication with the shaft body and the pivot sleeve annular body; and
a pivot sleeve magnet element attached to the first pivot sleeve end, the pivot sleeve magnet element being disposable adjacent the disk drive housing, the pivot sleeve magnet element being sized and configured to apply a magnetic force to the disk drive housing in a direction along the central axis for pre-loading the ball bearing set.

29. The head stack assembly of claim 28 wherein the pivot sleeve magnet element is sized and configured to apply a repulsive magnetic force to the disk drive housing in a direction along the central axis for pre-loading the ball bearing set.

30. The head stack assembly of claim 28 wherein the pivot shaft includes a shaft base, the shaft base extends radially from the central axis with the shaft body extending from the shaft base along the central axis, the shaft base is attachable to the disk drive housing, the first pivot sleeve end is disposed adjacent the shaft base, the pivot sleeve magnet element is disposed adjacent the shaft base, the pivot sleeve magnet element is sized and configured to apply a magnetic force to the shaft base in a direction along the central axis for pre-loading the ball bearing set.

31. The head stack assembly of claim 30 wherein the shaft body is integrally formed with the shaft base.

32. The head stack assembly of claim 30 wherein the shaft base is integrally formed with the disk drive housing.

33. The head stack assembly of claim 30 wherein the shaft base includes a base magnet element, the pivot sleeve magnet element is disposable adjacent the base magnet element, the pivot sleeve magnet element and the base magnet element are sized and configured to apply magnetic forces with respect to each other in a direction along the central axis for pre-loading the ball bearing set.

34. The head stack assembly of claim 33 wherein the base magnet element has a diameter greater than a diameter of the pivot sleeve magnet element.

35. A disk drive comprising:
a disk drive housing; and
a head stack assembly rotatably coupled to the disk drive housing, the head stack assembly including:
  a rotary actuator including a bore; and
  a pivot bearing cartridge including:
    a pivot shaft including a central axis and a shaft body disposed along the central axis;
    a pivot sleeve including a pivot sleeve annular body and a first pivot sleeve end disposable adjacent the disk drive housing;
    a ball bearing set disposed between and in mechanical communication with the shaft body and the pivot sleeve annular body; and
    a pivot sleeve magnet element attached to the first pivot sleeve end, the pivot sleeve magnet element being disposable adjacent the disk drive housing, the pivot sleeve magnet element being sized and configured to apply a magnetic force to the disk drive housing in a direction along the central axis for pre-loading the ball bearing set.

36. The disk drive of claim 35 wherein the pivot sleeve magnet element is sized and configured to apply a repulsive magnetic force to the disk drive housing in a direction along the central axis for pre-loading the ball bearing set.

37. The disk drive of claim 35 wherein the pivot shaft includes a shaft base, the shaft base extends radially from the central axis with the shaft body extending from the shaft base along the central axis, the shaft base is attachable to the disk drive housing, the first pivot sleeve end is disposed adjacent the shaft base, the pivot sleeve magnet element is disposed adjacent the shaft base, the pivot sleeve magnet element is sized and configured to apply a magnetic force to the shaft base in a direction along the central axis for pre-loading the ball bearing set.

38. The disk drive of claim 37 wherein the shaft body is integrally formed with the shaft base.

39. The disk drive of claim 37 wherein the shaft base is integrally formed with the disk drive housing.

40. The disk drive of claim 37 wherein the shaft base includes a base magnet element, the pivot sleeve magnet element is disposable adjacent the base magnet element, the pivot sleeve magnet element and the base magnet element are sized and configured to apply magnetic forces with respect to each other in a direction along the central axis for pre-loading the ball bearing set.

41. The disk drive of claim 40 wherein the base magnet element has a diameter greater than a diameter of the pivot sleeve magnet element.

* * * * *